UNITED STATES PATENT OFFICE

GEORG KALISCHER, OF FRANKFORT-ON-THE-MAIN, AND WERNER LANGE, OF DESSAU-ZIEBIGK IN ANHALT, GERMANY, ASSIGNORS TO GENERAL ANILINE WORKS, INC., OF NEW YORK, N. Y., A CORPORATION OF DELAWARE

COMPOUNDS HAVING AN AFFINITY FOR COTTON AND BEING DIAZOTIZABLE ON THE FIBER

No Drawing. Application filed February 16, 1929, Serial No. 340,654, and in Germany January 18, 1928.

The present invention relates to new compounds of a mostly yellowish appearance, which have an affinity for cotton. One may diazotize them on the fiber and combine the diazo-compounds with suitable components to produce dyestuffs. In this way with developers for yellow, for example with pyrazolones, beautiful yellow tints, fast to washing and to the action of light, are obtainable.

The new compounds are salts of sulfonic acids which probably correspond to the general formula:

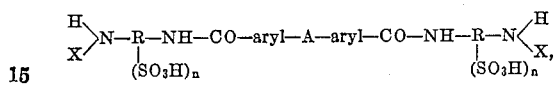

wherein R represents an aromatic radicle, X stands for a substituent comprising hydrogen or, bound to the nitrogen atom by a .CO. group, for an aromatic radicle substituted by $NH_2$, A represents a group comprising the azo- and the azoxy-group and wherein $n \geqq 1$.

The production of these compounds is based on the observation that it is possible by a slight reduction of sulfonic acids of nitro benzoylated aromatic amino-compounds containing in their molecule the grouping

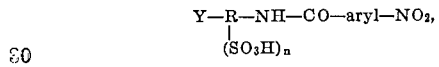

wherein R represents an aromatic radicle, Y stands for a group comprising $NO_2, NH_2, NH$-acyl and $NH \cdot CO$-aryl-$NO_2$; and wherein $n \geqq 1$, to link the nitrogen atom of a nitro-group of one molecule to the nitrogen atom of a nitro-group of another molecule, an azo- or an azoxy-group thus being formed.

When starting from a dinitro-compound, that is to say, from a compound of the following general formula:

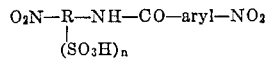

and especially of the formula:

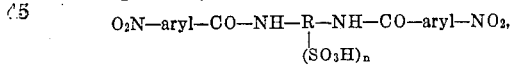

R and $n$ with the signification as above, more than two, for instance three or four, molecules may be united; besides the reduction of nitro-groups in order to unite one molecule with another molecule, a formation of amino-groups may occur.

If a free amino-group has been present in the starting material or if amino-groups are formed from nitro-groups by reduction or from substituted amino-groups, such as acylamino-groups, by eliminating the substituent, for instance the acyl group, the new amino-compounds, being the object of the present invention, are obtained.

If free amino-groups of the compounds resulting by the said process are nitrobenzoylated and the nitro-groups are reduced, compounds are obtained possessing the same properties as indicated above.

The constitution of all these new amino-compounds corresponding to the first formula given above may therefore also be expressed by the more generalized formula:

$$H_2N - R - NH \cdot OC \text{-aryl-A-aryl-} \\ CO \cdot HN - R - NH_2$$

wherein R represents an aromatic radicle or a plurality of aromatic radicles linked one to another by an atomic linkage of the group consisting of $\cdot CO \cdot NH \cdot, \cdot HN \cdot CO \cdot NH \cdot,$

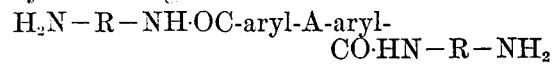

and wherein A represents an atomic linkage of the group consisting of $\cdot N = N \cdot,$

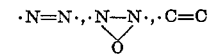

said compounds containing at least one $\cdot SO_3H$ residue.

In the foregoing formulæ the term aryl signifies the radicle of benzene that is to say $(1) - C_6H_4 - (3)$, and more especially $(1) - C_6H_4 - (4)$.

Under this circumstance the first formula given above assumes the form

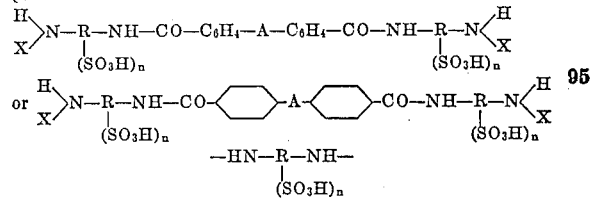

being the radicle of 1.4-diamino-benzene-2- sulfonic acid, 1-methyl-2.4-diamino benzene-5-sulfonic acid, 1.4-diamino naphthalene-6-sulfonic acid, 2.7-diamino naphthalene-3.6-disulfonic acid, benzidine-2, 2'-disulfonic acid, benzidine-3,3'-disulfonic acid, diamino stilbene-disulfonic acid, 4,4'-diamino diphenyl-carbamide-3,3'-disulfonic acid.

If R is the radicle of benzene, the formulæ are to read for instance:

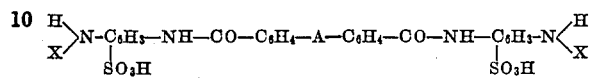

or more especially:

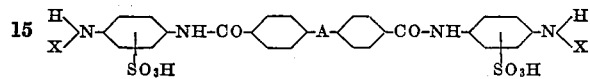

As X may represent besides hydrogen an aromatic radicle substituted by $NH_2$ and linked by the CO group the foregoing formulæ may be written for example as follows:

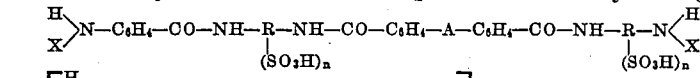

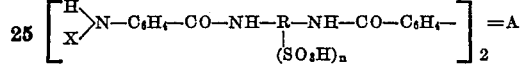

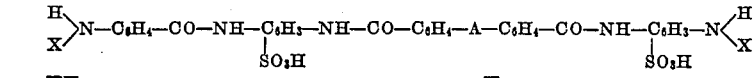

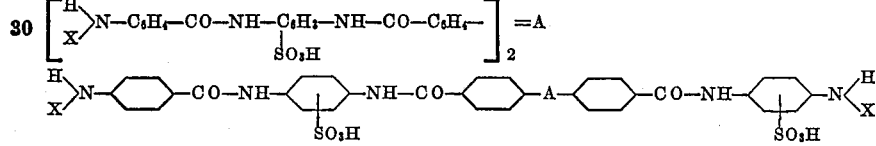

wherein X stands again for a substituent comprising hydrogen or, bound to the nitrogen atom by a ·CO· group, for an aromatic radicle substituted by $NH_2$. For instance X may represent an aromatic radicle containing the grouping $-CO-C_6H_4-NH_2$ and more especially

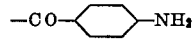

and may also contain the azo- or the azoxy-group so that the compound may include in its molecule more than twice the group $-CO-C_6H_4-NH-$ and more than once the azo- or azoxy-group, signified above by the symbol A.

Then for the generalized formula given above $H_2N-R-NH.OC$-aryl-A-aryl-$CO.HN-R-NH_2$ includes, for example, the formulæ

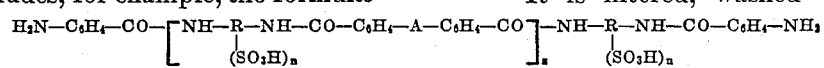

and more especially:

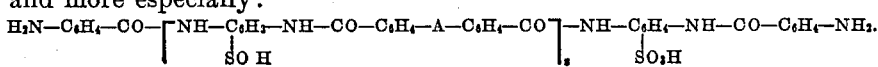

wherein $z$ means the number 1 or a whole number greater than 1.

The following examples illustrate the invention without limiting it, the parts being by weight:

*Example 1.*—36·7 parts of sodium 1-amino-4-(4'-nitrobenzoylamino)-benzene-2-sulfonate

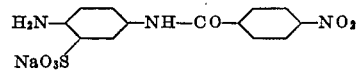

are dissolved in 1000 parts of water. At 20° C. a solution is added prepared from 4 parts of sodium hydroxide and 7.8 parts of anhydrous sodium sulfide and the mixture is stirred until the sulfide has disappeared. The yellow compound which is deposited is filtered from the liquor and purified by dissolving in water and reprecipitation. It is absorbed from its aqueous solution by cotton yielding a pale yellow. Diazotized on the fiber and combined with 1-phenyl-3-methyl-5-pyrazolone it gives a strong greenish yellow. In form of the free acid it probably corresponds to the formula:

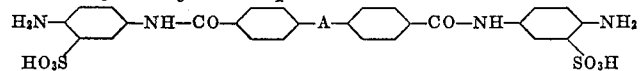

In this formula and in the formulæ following hereafter A represents the azo or the azoxy group, as it is doubtful whether the atomic linkage formed by the slight reduction of the nitro group is the azo or the azoxy group.

*Example 2.*—A solution of 16 parts of glucose in 100 parts of water is run at 50° C. into a solution of 33.7 parts of 1-amino-4-(4'-nitrobenzoylamino)-benzene-2-sulphonic acid in 600 parts of water and 30 parts of a solution of sodium hydroxide of 40° Bé., the temperature then being raised to 60–70° C. After some time even from the hot solution a pale yellow crystalline compound separates. It is filtered, washed with a solution of sodium chloride until a neutral reaction is attained and then dried. The product is similar to that of Example 1 and probably corresponds to the formula given in Example 1.

*Example 3.*—35·1 parts of 1-methyl-2-amino-4- (4'-nitrobenzoylamino) -benzene-5-sulfonic acid

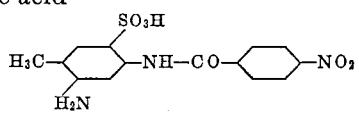

are dissolved with aid of 30 parts of a solution of sodium hydroxide of 40° Bé. in 800 parts of water. An aqueous solution of 16 parts of glucose is allowed to run into this solution heated to 70° C. After a short time a yellow compound begins to settle. It is separated from the lye in the usual manner. It is soluble in concentrated sulfuric acid to a yellow solution. Its diazo-compound furnishes when coupled with 2-hydroxynaphthalene-3.6-disulfonic acid a scarlet dyestuff. It probably corresponds to the following formula:

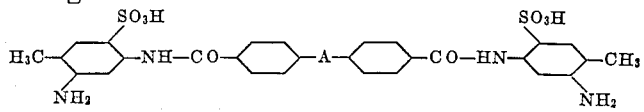

The same compound is obtainable when the reduction is carried out by using instead of the glucose the corresponding quantity of arsenious oxide, sodium sulfide or zinc dust.

A similar compound is obtained by starting from 1-methyl-2-amino-4-(3'-nitrobenzoylamino)-benzene-5-sulfonic acid.

*Example 4.*—Into a solution prepared from 46·7 parts of 1-(4'-nitrobenzoylamino)-5-amino-naphthalene-3.7-disulfonic acid

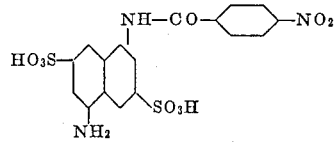

600 parts of water and 35 parts of a solution of sodium hydroxide of 40° Bé. an aqueous solution of 16 parts of glucose is introduced. The solution is heated for half an hour to 60–70° C. and then the compound formed is separated by hydrochloric acid in the shape of orange-yellow flocks and isolated in the usual manner. Its sodium salt dissolves in hot water to a reddish-yellow solution and may be salted out from the solution. In concentrated sulfuric acid the compound is soluble to a yellow solution. In the form of the free acid the product obtained probably corresponds to the following formula:

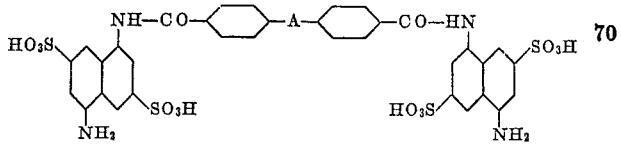

*Example 5.*—38·7 parts of sodium 1-formyl-amino-4-(4'-nitrobenzoylamino)-benzene-3-sulfonate

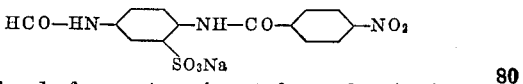

obtained from 4-amino-1-formylaminobenzene-3-sulfonic acid and 4-nitrobenzoylchloride, are dissolved in 1000 parts of water. At a temperature of 20° C. 7·8 parts of anhydrous sodium sulfide are added. The rest of the procedure is as described in Example 1 and from the product the formyl residue is eliminated by boiling the product for a short time with a sodium hydroxide solution of ½ to 1 per cent. strength. Thus a product is obtained similar to that of Example 1 corresponding probably to the formula:

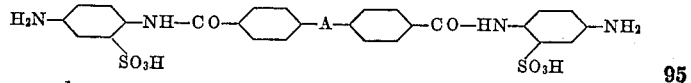

*Example 6.*—48·6 parts of 1.4-di-(4'-nitrobenzoylamino)-benzene-2-sulfonic acid

(obtainable by condensation of two molecular proportions of para-nitrobenzoylchloride and one molecular proportion of 1.4-diamino benzene-2-sulfonic acid), are introduced, while stirring, into a hot mixture of 500 parts of water, 33 parts of zinc-dust and 10 parts of glacial acetic acid, and the mass is then boiled for 5–10 minutes. First a colorless compound, possibly a hydrazo-compound, is formed, which by the action of air readily becomes yellow. The mass is diluted by 700 parts of water and made slightly alkaline with 12 parts of sodium carbonate. From the solution freed from zinc oxide the product separates on cooling. It is absorbed by cotton yielding a pale green-yellow and furnishes, when diazotized on the fiber and coupled with 1-phenyl-3-methyl-5-pyrazolone, a brilliant strong greenish yellow, very fast to washing and to light. When the new compounds are boiled for a longer time with an excess of zinc-dust and acetic acid the known diamino-compound corresponding with the starting material is formed.

The new compound probably corresponds to the formula:

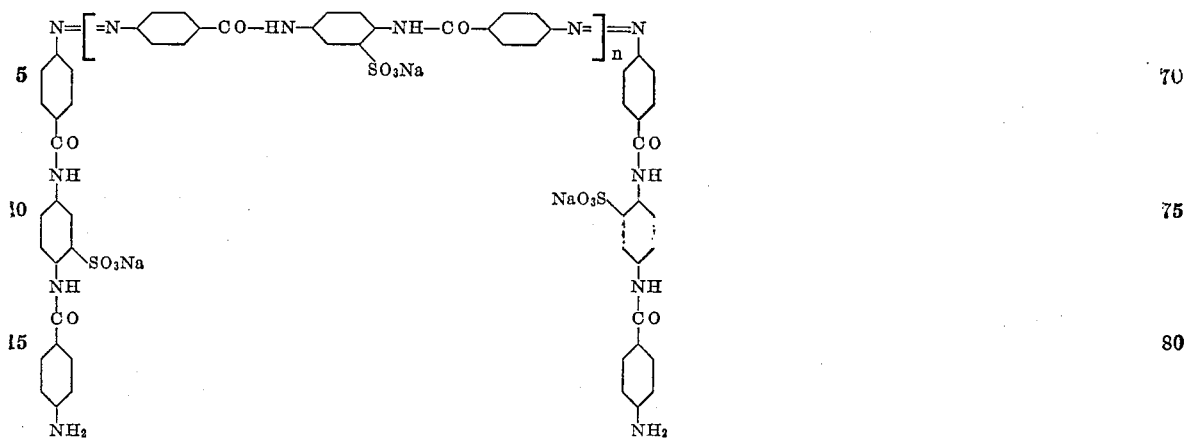

In this formula n is zero or a whole number. For the sake of simplicity we have inserted in this formula and likewise in the formulæ of Examples 7, 8, 9, 10, and 13 the group ·N=N· representing the atomic linkage; however, perhaps this linkage may be an azoxy group, inasmuch as it is uncertain whether the azo or the azoxy group is formed.

*Example 7.*—50.8 parts of sodium 1.4-di-(4'-nitrobenzoylamino)-benzene-2-sulfonate (the sodium salt of the sulfonic acid indicated in Example 6) are dissolved in 1000 parts of water. At a temperature of 20° C. a solution of 4 parts of sodium hydroxide and 20 parts of anhydrous sodium sulfide is added and then the mixture is stirred during about 20 hours. The yellow compound which deposits is separated from the liquor and purified by dissolving in water and re-precipitated. The product is identical in tinctorial properties with that of Example 6.

*Example 8.*—50.8 parts of sodium 1.4-di-(3'-nitrobenzoylamino)-benzene-2-sulfonate

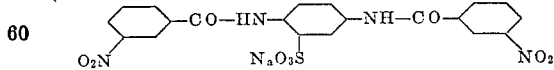

(obtainable by condensation of one molecular proportion of 1.4-diaminobenzene-2-sulfonic acid and two molecular proportions of 3-nitro benzoyl chloride) are reduced according to Example 6 or 7. The product is nearly colorless. It has an affinity for cotton similar to that of the products of the foregoing examples and may be transformed into dyestuffs in the same manner.

It may be represented by the following formula:

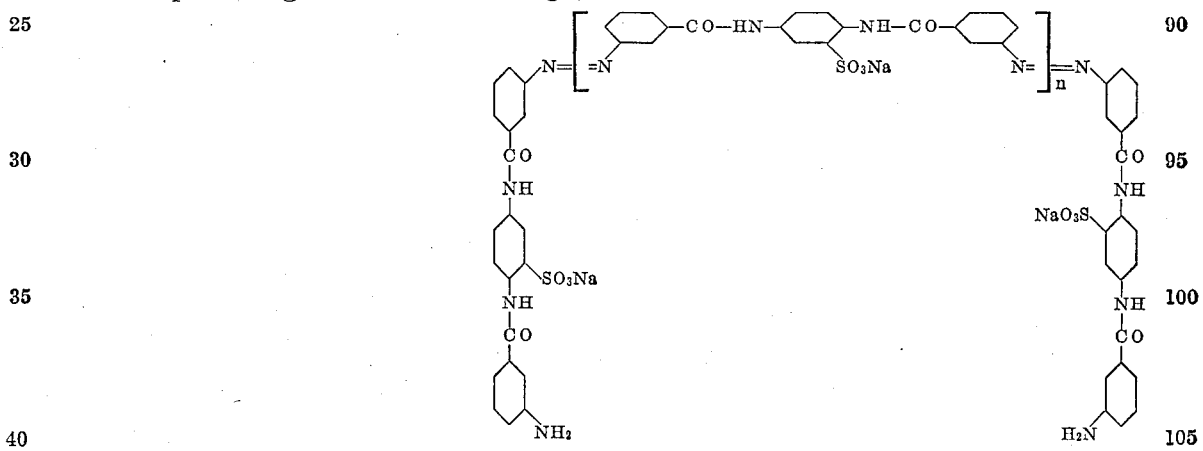

*Example 9.*—55.8 parts of sodium 1.4-di-(4'-nitrobenzoylamino)-naphthalene-6-sulfonate

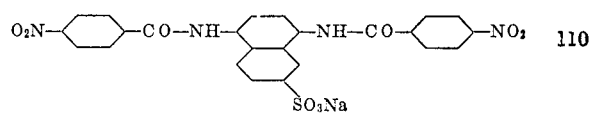

obtainable from 1.4-diaminonaphthalene-6-sulfonic acid and 4-nitrobenzoylchloride, are suspended in 100 parts of water. At a temperature of 20° C. a solution of 10 parts of sodium hydroxide and 20 parts of anhydrous sodium sulfide is added and the mass is stirred until the sulfide has disappeared. The reaction product is precipitated by adding 50 parts of sodium chloride, separated from the liquor and purified by dissolving in water and reprecipitation.

The dry compound is a light yellow powder. It dyes cotton pale yellow. When it is diazotized on the fiber and combined with 1-phenyl-3-methyl-5-pyrazolone, strong greenish yellow tints of a good fastness are obtained. It probably corresponds to the following formula:

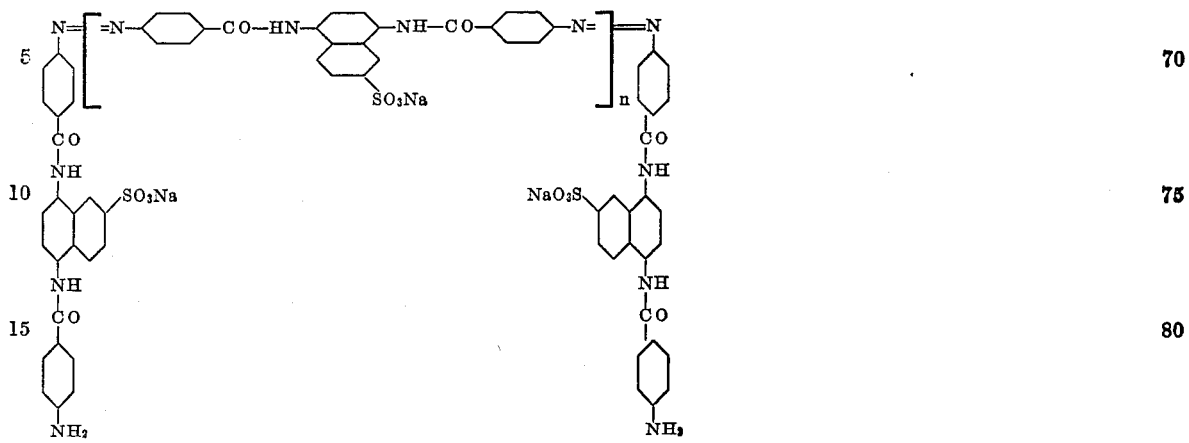

*Example 10.*—74.4 parts of sodium 4.4′-di-(4″-nitrobenzoyl-amino)-diphenyl-carbamide-3.3′-disulfonate

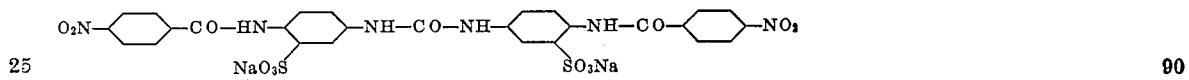

are dissolved in 1500 parts of hot water. At a temperature of 20° C. a solution of 8 parts of sodium hydroxide and 20 parts of anhydrous sodium sulfide is added and the mixture is stirred during about 20 hours. The product salted out by means of 100 parts of sodium chloride may be purified by dissolving in water and reprecipitation. In the dry state it forms a yellow powder. The compound dyes cotton slightly green-yellow and gives when diazotized and coupled on the fiber with 1-phenyl-3-methyl-5-pyrazolone brilliant green-yellow tints very fast to washing and to light. It probably corresponds to the following formula:

form of a yellow precipitate. It is separated from the liquid and washed with a solution of sodium chloride until a neutral reaction is attained. By acidifying with dilute hydrochloric acid, filtration, washing and drying a product free from salt may be obtained.

94 parts of this product are dissolved in 2000 parts of hot water by addition of 19.4 parts of sodium hydroxide. A concentrated solution of 7.6 parts of crystallized sodium sulfide is added at 20° C. and the mixture is stirred until the sulfide disappears. The yellow reduction-product is separated by addition of hydrochloric acid, filtered, washed with water and dried after addition of the quantity of dry sodium carbonate necessary to transform the sulfonic acid into its sodium salt. The product thus obtained is absorbed from the aqueous solution by cotton yielding a pale yellow. Diazotized on the fiber and

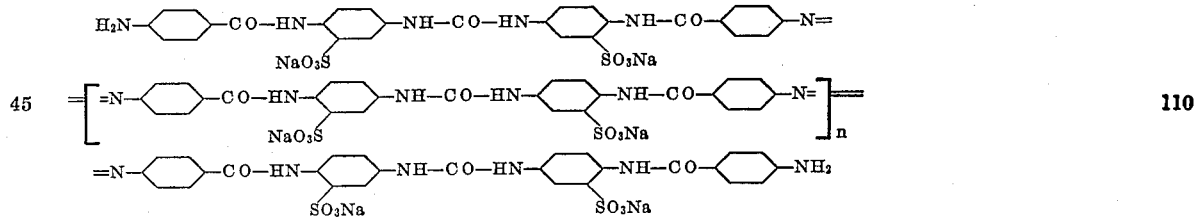

*Example 11.*—35 parts of the product obtainable according to Example 3 and 10 parts of sodium carbonate are dissolved at 60–65° C. in a mixture of 560 parts of water and 290 parts of acetone. While stirring at 60–65° C. an excess of 4-nitrobenzoyl chloride dissolved in acetone is introduced and the mixture is heated until no more diazotizable compound is present. The acetone is distilled with steam. The sodium salt of the doubly nitrobenzoylated compound is obtained in the combined with 1-phenyl-3-methyl-5-pyrazolone it gives a strong greenish yellow. It probably corresponds to the following formula:

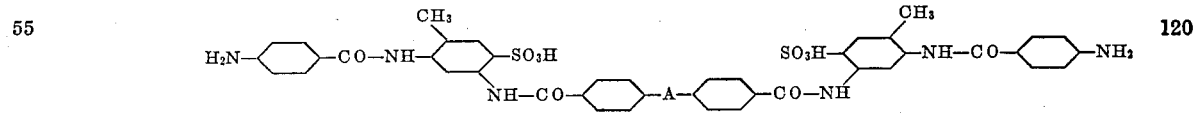

*Example 12.*—94 parts of the doubly nitrobenzoylated product employed in Example 11 are dissolved in 2000 parts of hot water by addition of 19.4 parts of sodium hydroxide. Then 65 parts of acetic acid of 98 per cent. strength are added and the yellow-brown compound is reduced with 66 parts of zinc dust, while boiling, in the course of 5–10 minutes. Sodium carbonate is added until the reaction becomes feebly alkaline. From the filtrate by dilute hydrochloric acid the product described in Example 11 is precipitated.

*Example 13.*—36.7 parts of 1-(4'-nitrobenzolamino)-4-nitrobenzene-2-sulphonic acid

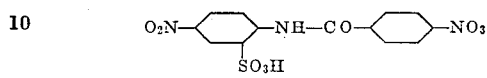

are introduced, while stirring, into a hot mixture of 500 parts of water, 33 parts of zinc-dust and 10 parts of acetic acid of 98 per cent. strength. The mass is boiled for 10 minutes, then diluted by 700 parts of water and made slightly alkaline with 12 parts of sodium carbonate. The product separated from the solution freed from zinc oxide is drained and dried. It is absorbed from its solution by cotton with a yellowish color. When diazotized on the fiber and coupled with 1-phenyl-3-methyl-5-pyrazolone a brilliant yellow results. It probably corresponds to the following formula:

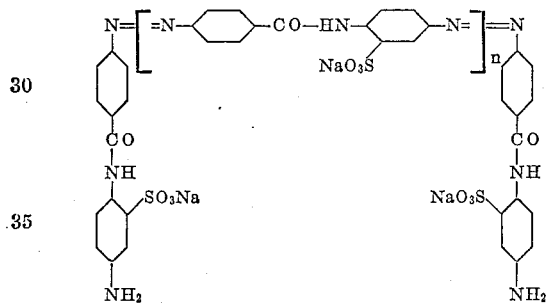

In the foregoing example the starting material may be replaced by the corresponding 3-sulphonic acid.

Products with similar properties are obtainable by starting from a nitrobenzolaminoarylsulfonic acid, such as 1-(4'-nitrobenzolamino)-4-nitronaphthalene-6- or 7-sulfonic acid, or from a mono- or di-(3- or 4-)nitrobenzoylated diaminoarylsulfonic acid such as 1-methyl-2.4-diaminobenzene-5-sulfonic acid, 1.4-diaminonaphthalene-6-sulfonic acid, 2.7-diaminonaphthalene-3.6-disulfonic acid, benzidine-2.2'- or 3,3'-disulfonic acid, diaminostilbene-disulfonic acid, 4.4'-diaminodiphenylcarbamide -3,3'-disulfonic acid.

As shown in the examples and the foregoing paragraph, a great number of various starting materials are suitable for being subjected to our reduction process in order to be transformed to new products having an excellent affinity for the chemically unprepared cotton fiber. These starting materials are characterized by the presence of at least one nitrobenzoyl group yielding by a slight reduction the atomic linkage between two or more molecules, and they belong to the benzene and naphthalene series and include such compounds as contain two benzene nuclei, such as diphenyl and stilbene, and such compounds in which two or more benzene nuclei are linked together by an atomic linkage of the group consisting of .HN—CO—NH.,

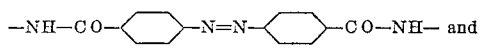
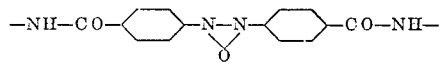

In the following claims the term "a compound of the benzene series" is intended to include such possibilities.

We claim:—

1. Process of producing compounds having an affinity for cotton and being diazotizable on the fiber which process comprises treating with a reducing agent a compound of the general formula:

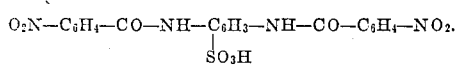

2. Process of producing compounds having an affinity for cotton and being diazotizable on the fiber which process comprises treating with a reducing agent the compound of the formula:

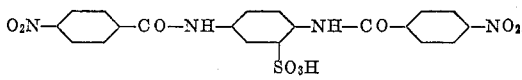

3. As new products, the compounds which have an affinity for cotton, are diazotizable on the fiber and are salts of sulfonic acids probably corresponding to the general formula:

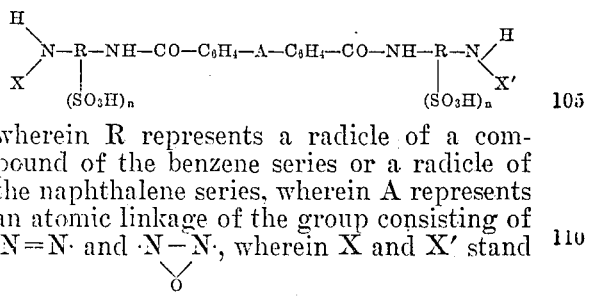

wherein R represents a radicle of a compound of the benzene series or a radicle of the naphthalene series, wherein A represents an atomic linkage of the group consisting of ·N=N· and ·N—N·, wherein X and X' stand
           \/
           O for hydrogen or, bound to the nitrogen by a ·CO· group, for a radicle of a compound of the benzene series of a radicle of the naphthalene series, said radicle bearing a terminal NH$_2$ group, and wherein $n$ means the number 1 or a whole number greater than 1.

4. As new products, the compounds which have an affinity for cotton, are diazotizable on the fiber and are salts of sulfonic acids probably corresponding to the general formula:

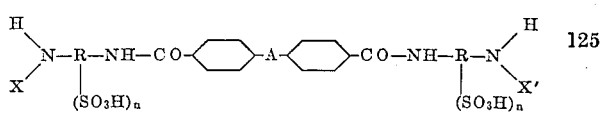

wherein R represents a radicle of a compound of the benzene series of a radicle of the naphthalene series, wherein A represents an atomic linkage of the group consisting of ·N=N· and ·N—N·, wherein X and X' stand for hydrogen or, bound to the nitrogen by a ·CO· group, for a radicle of a compound of the benezene series or a radicle of the naphthalene series, said radicle bearing a terminal NH₂ group, and wherein n means the number 1 or a whole number greater than 1.

5. As new products, the compounds of a yellowish appearance which have an affinity for cotton, are diazotizable on the fiber and are salts of sulfonic acids probably corresponding to the general formula:

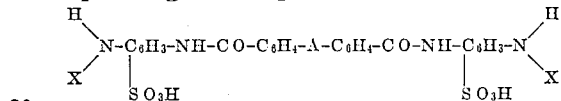

wherein A represents an atomic linkage of the group consisting of the azo and the azoxy group, and wherein X and X' stand for hydrogen or, bound to the nitrogen atom by a ·CO· group, for a radicle of a compound of the benzene series bearing a terminal NH₂ group.

6. As new products, the compounds of a yellowish appearance which have an affinity for cotton, are diazotizable on the fiber and are salts of sulfonic acids probably corresponding to the general formula:

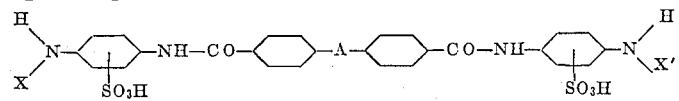

wherein A represents an atomic linkage of the group consisting of the azo and the azoxy group, and wherein X and X' stand for hydrogen or, bound to the nitrogen atom by a ·CO· group, for a radicle of a compound of the benzene series bearing a terminal NH₂ group.

7. As new products, the compounds of a yellowish appearance which have an affinity for cotton, are diazotizable on the fiber and are salts of sulfonic acids probably corresponding to the general formula:

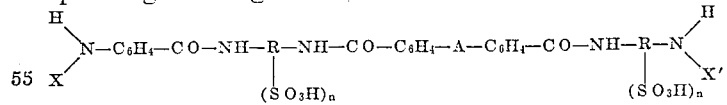

wherein R represents a radicle of a compound of the benzene series or a radicle of the naphthalene series, wherein A represents an atomic linkage of the group consisting of ·N=N· and ·N—N·, wherein X and X' stand for hydrogen or, bound to the nitrogen by a ·CO· group, for a radicle of a compound of the benzene series or a radicle of the naphthalene series, said radicle bearing a terminal NH₂ group, and wherein n means the number 1 or a whole number greater than 1.

8. As new products, the compounds of a yellowish appearance which have an affinity for cotton, are diazotizable on the fiber and are salts of sulfonic acids probably corresponding to the general formula:

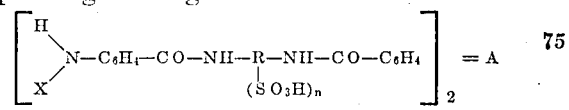

wherein R represents a radicle of a compound of the benzene series or a radicle of the naphthalene series, wherein A represents an atomic linkage of the group consisting of ·N=N· and ·N—N·, wherein X stands for hydrogen or, bound to the nitrogen by a ·CO· group, for a radicle of a compound of the benzene series or a radicle of the naphthalene series, said radicle bearing a terminal NH₂ group, and wherein N means the number 1 or a whole number greater than 1.

9. As new products, the compounds of a yellowish appearance which have an affinity for cotton, are diazotizable on the fiber and are salts of sulfonic acids probably corresponding to the general formula:

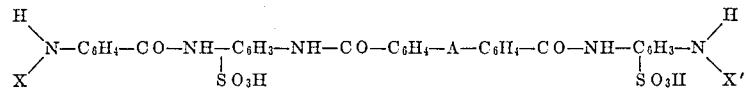

wherein A represents an atomic linkage of the group consisting of the azo and the azoxy group, and wherein X and X' stand for hydrogen or, bound to the nitrogen atom by a ·CO· group, for a radicle of a compound of the benzene series bearing a terminal NH₂ group.

10. As new products, the compounds of a yellowish appearance which have an affinity for cotton, are diazotizable on the fiber and are salts of sulfonic acids probably corresponding to the general formula:

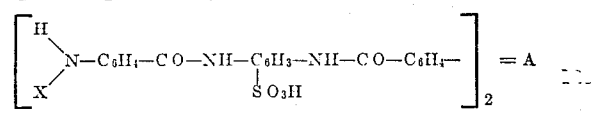

wherein A represents an atomic linkage of the group consisting of the azo and the azoxy group and wherein X stands for hydrogen or, bound to the nitrogen atom by a ·CO· group, for a radicle of a compound of the benzene series bearing a terminal NH₂ group.

11. As new products, the compounds of a yellowish appearance which have an affinity for cotton, are diazotizable on the fiber and are salts of sulfonic acids probably corresponding to the general formula:

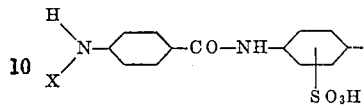

wherein A represents an atomic linkage of the group consisting of the azo and the azoxy group, and wherein X and X' stand for hydrogen or, bound to the nitrogen atom by a ·CO· group, for a radicle of a compound of the benzene series bearing a terminal NH₂ group.

12. As new products, the compounds of a yellowish appearance which have an affinity for cotton, are diazotizable on the fiber and are salts of sulfonic acids probably corresponding to the general formula:

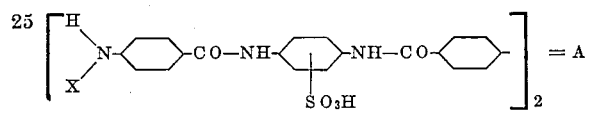

wherein A represents an atomic linkage of the group consisting of the azo and the azoxy group and wherein X stands for hydrogen or, bound to the nitrogen atom by a ·CO· group, for a radicle of a compound of the benzene series bearing a terminal NH₂ group.

13. As new products, the compounds of a yellowish appearance which have an affinity for cotton, are diazotizable on the fiber and are salts of sulfonic acids probably correspondnig to the general formula:

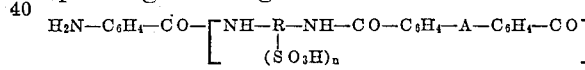

wherein A represents an atomic linkage of the group consisting of the azo and the azoxy group, wherein R represents a radicle of a compound of the benzene series or a radicle of the naphthalene series, and wherein n and z mean the number 1 or a whole number greater than 1.

14. As new products, the compounds of a yellowish appearance which have an affinity for cotton, are diazotizable on the fiber and are salts of sulfonic acids probably corresponding to the general formula:

wherein A represents an atomic linkage of the group consisting of the azo and the azoxy group and wherein z means the number 1 or a whole number greater than 1.

15. Process of producing compounds having an affinity for cotton and being diazotizable on the fiber, which comprises introducing about 48.6 parts of 1.4-di(4-nitrobenzoylamino)-benzene-2 sulfonic acid while stirring into a hot mixture of about 500 parts of water, about 33 parts of zinc dust and 10 parts of

glacial acetic acid, boiling for about 5 to 10 minutes, diluting with water and freeing the solution from zinc compounds by addition of sodium carbonate and filtration.

16. Process of producing compounds having an affinity for cotton and being diazotizable on the fiber, which comprises treating with a reducing agent a compound of the general formula:

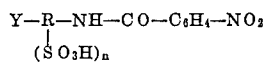

wherein R represents a radicle of a compound of the benzene series or a radicle of the naphthalene series, Y stands for a substituent of the group consisting of ·NO₂, ·NH₂, ·NH-acyl and ·NH·CO·C₆H₄·NO₂, and wherein n means the number 1 or a whole number greater than 1.

17. Process of producing compounds having an affinity for cotton and being diazotizable on the fiber, which comprises treating with a reducing agent a compound of the general formula:

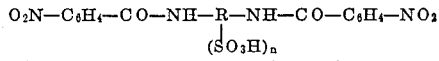

wherein R represents a radicle of a compound of the benzene series or a radicle of the naphthalene series and n means the number 1 or a whole number greater than 1.

18. As new products, the compounds of a yellowish appearance which have an affinity for cotton, are diazotizable on the fiber and are salts of sulfonic acids probably corresponding to the general formula

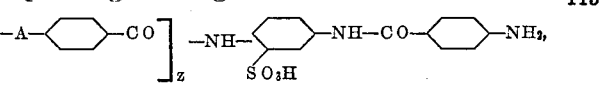

wherein A represents an atomic linkage of the group consisting of the azo and the azoxy group and wherein z means the number 1 or a whole number greater than 1.

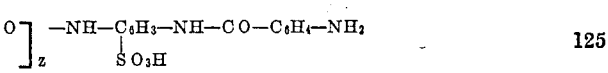

19. As new products, the compounds of a yellowish appearance which have an affinity for cotton, are diazotizable on the fiber and are salts of sulfonic acids probably corresponding to the general formula

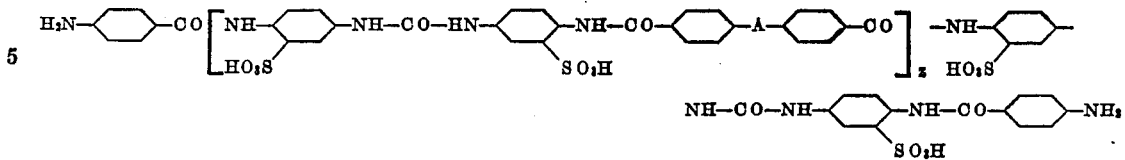

wherein A represents an atomic linkage of the group consisting of the azo and the azoxy group and wherein $z$ means the number 1 or a whole number greater than 1.

20. Process of producing compounds having an affinity for cotton and being diazotizable on the fiber, which comprises acting upon 74.4 parts of sodium 4.4'-di-(4''-nitrobenzoylamino)-diphenyl carbamide-3.3'-disulfonate of the formula

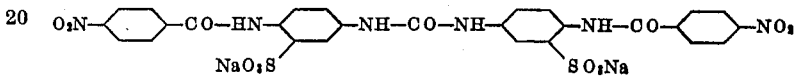

dissolved in water with 8 parts of sodium hydroxide and 20 parts of anhydrous sodium sulfide for about 20 hours at about 20° C.

In testimony whereof, we affix our signatures.

GEORG KALISCHER.
WERNER LANGE.

Certificate of Correction

Patent No. 1,823,743. Granted September 15, 1931, to

GEORG KALISCHER ET AL.

It is hereby certified that error appears in the printed specification of the above-numbered patent requiring correction as follows: Page 1, line 116, for the numeral "100" read *1000*; page 6, line 130, claim 4, for "of" second occurrence read *or*; page 7, lines 95-98, claim 9, strike out the formula and insert instead— and that the said Letters Patent should be read with these corrections therein that the same may conform to the record of the case in the Patent Office.

Signed and sealed this 22d day of December, A. D. 1931.

[SEAL.]
M. J. MOORE,
*Acting Commissioner of Patents.*